UNITED STATES PATENT OFFICE.

PAUL THOMASCHEWSKI, OF ELBERFELD, GERMANY, ASSIGNOR TO FARBENFABRIKEN VORM. FRIEDR. BAYER & CO., OF ELBERFELD, GERMANY, A CORPORATION OF GERMANY.

ANTHRAQUINONE DERIVATIVE.

No. 853,041.  Specification of Letters Patent.  Patented May 7, 1907.

Application filed February 11, 1907. Serial No. 356,811.

*To all whom it may concern:*

Be it known that I, PAUL THOMASCHEWSKI, doctor of philosophy, chemist, a citizen of the German Empire, residing at Elberfeld, Kingdom of Prussia, Germany, have invented new and useful Improvements in Anthraquinone Derivatives, of which the following is a specification.

I have found that acetylized secondary alkylamino- or arylaminoanthraquinones are converted into new compounds by treatment with alkalies. The new anthraquinone derivatives most probably contain a pyridone ring formed by intramolecular condensation. They are more or less colored crystalline compounds of basic character practically insoluble in water and soluble in pyridin and in concentrated sulfuric acid with from a yellow to red color.

The acetylized derivatives of secondary alkylamino- or arylaminoanthraquinones (the parent materials for the production of the new compounds) can be obtained by boiling the secondary alkylamino- or arylaminoanthraquinones with from twice to five times their weight of acetic anhydrid.

The invention is illustrated by the following examples, the parts being by weight:

Example I.—10 parts of finely powdered acetyl alpha-methylaminoanthraquinone are heated to boiling with 500 parts of water and 10 parts of an aqueous solution of NaOH of 34° Bé. After 6 hours' heating the amorphous body is transformed into crystals. It is filtered off and washed. The new compound crystallizes from pyridin in the shape of yellow needles. The reaction takes place in accordance with the following equation, a pyridone ring being most probably closed:

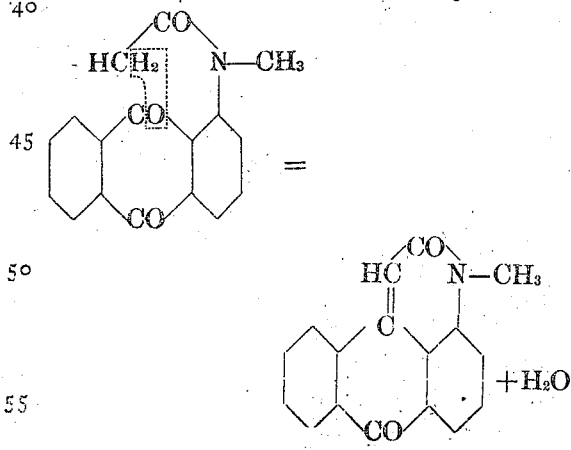

Example II.—5 parts of acetyl-1-methylamino-4-nitroanthraquinone are boiled for 3 hours with a solution of 2 parts of sodium in 50 parts of anhydrous methyl alcohol. By the action of the sodium methylate the nitro group in 4 position is replaced by the methoxy group. The compound obtained has most probably the formula:

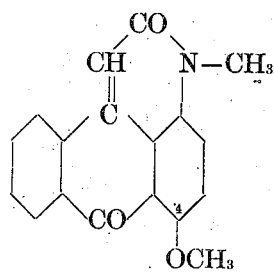

Example III.—1-methylamino-4-paratolylaminoanthraquinone is converted into the acetylized derivative by heating to boiling one part of it with one part of acetic anhydrid for one hour. The mixture of the reaction is then diluted with 2 parts of alcohol and the precipitate thus obtained (garnet-red crystals) is filtered off. It is soluble in concentrated sulfuric acid with a dull-green color. One part of 1-acetylmethylamino-4-paratolylaminoanthraquinone is heated to boiling with a solution of one part of NaOH in 10 parts of alcohol for 3 hours. The new compound deposits while cooling in the shape of dark-red crystals. It has most probably the following formula:

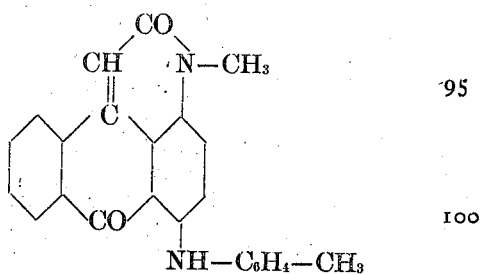

*Analysis.*

Calculated for $C_{24}H_{18}O_2N_2$.

| | Found. |
|---|---|
| C = 78.68% | 78.81% |
| H = 4.92% | 5.24% |
| N = 7.66% | 7.84% |

It crystallizes from pyridin in the shape of bronze-like leaflets. Its sulfonic acid dyes unmordanted and chromed wool bluish-red fast shades.

To prepare this dyestuff-sulfonic acid one part of the compound is gently heated with 20 parts of sulfuric acid monohydrate until a test portion dissolves without any residue in dilute caustic soda. The melt is then diluted with water and the dyestuff sulfonic acid is filtered off. Its alkaline salts are soluble in water with a crimson-red color.

The process is carried out in an analogous manner if other of the above mentioned anthraquinone derivatives, or other alkalies be used.

| Condensation product (pyridone) obtained from | | Solution in pyridin. | Solution in concentrated sulfuric acid. |
|---|---|---|---|
| Acetyl-alpha-methyl-amino-anthraquinone. | Yellow needles. | Yellow. | Yellow with yellow fluorescence. |
| Diacetyl-1.5-dimethyldiaminoanthraquinone | Orange needles. | Orange-yellow. | Yellowish with sky-blue fluorescence. |
| Acetyl-1-methylamino-4-nitro-anthraquinone. | Yellow needles. | Yellow. | Yellow with green fluorescence. |
| Acetyl-alpha-para-tolylaminoanthraquinone. | Yellow crystals. | Yellow. | Yellow without fluorescence. |
| 1-acetylmethyl-amino-4-paratolylaminoanthraquinone. | Bronze-like crystals. | Violet-red. | Violet-red, copper red after addition of boric acid. |
| 1-acetylmethylamino-4-dimethylamino-anthraquinone (chlorhydrate). | Brownish-yellow prisms. | Crimson-red. | Yellow, yellow fluorescence after addition of boric acid. |

The product No. 6 dyes unmordanted wool and cotton mordanted with tannin reddish violet shades.

Having now described my invention and in what manner the same is to be performed, what I claim as new and desire to secure by Letters Patent is:—

1. The herein described anthracene compounds which can be obtained by treating acetylized secondary alkylamino- or arylaminoanthraquinones with alkalies; which anthracene compounds are crystalline and practically insoluble in water; and soluble in pyridin and in concentrated sulfuric acid with from a yellow to red color, substantially as hereinbefore described.

2. The herein-described anthracene compound which can be obtained by treating 1-acetylmethylamino-4-paratolylaminoanthraquinone with alkalies, which anthracene compound forms bronze-like leaflets soluble in pyridin with a violet-red color and in concentrated sulfuric acid with a violet-red color; and which in the shape of its sulfonic acid dissolves in dilute alkali with a crimson-red color, and dyes unmordanted and chromed wool bluish-red shades, substantially as hereinbefore described.

In testimony whereof I have hereunto set my hand in the presence of two subscribing witnesses.

PAUL THOMASCHEWSKI. [L. S.]

Witnesses:
OTTO KÖNIG,
J. A. RITTERSHAUS.